Patented May 12, 1925.

1,537,866

UNITED STATES PATENT OFFICE.

HAROLD A. MORTON, OF AKRON, OHIO, ASSIGNOR TO THE MILLER RUBBER COMPANY, OF AKRON, OHIO, A CORPORATION OF OHIO.

PROCESS OF MANUFACTURE OF SHEET RUBBER.

No Drawing.  Application filed June 4, 1924. Serial No. 717,898.

*To all whom it may concern:*

Be it known that I, HAROLD A. MORTON, a citizen of the United States, and resident of Akron, in the county of Summit and State of Ohio, have invented certain new and useful Improvements in Processes of Manufacture of Sheet Rubber, of which the following is a specification.

My present invention relates to the method of manufacturing sheet rubber.

On account of the great activity of many of the so-called ultra accelerators in the presence of zinc oxide or other zinc salts, it is impossible to mix these materials on a mill in ordinary factory practice, due to the heat generated on the mill. However, it has been known for some time that a great many accelerators which are ultra accelerators in the presence of a zinc salt are not ultra accelerators in the absence of a zinc salt and in many cases are actually very slow acting accelerators in the latter condition.

I have found that I can prepare a cured sheet of rubber containing such ultra accelerators and without danger of mill burning, by the utilization of a migratory zinc compound in the manner hereinafter described. The process roughly consists in mixing two separate stocks in the usual way, the first stock containing rubber, sulphur, and a migratory organic accelerator which is free from zinc in any form, and which will cure at low temperatures in the presence of zinc, and to which accelerators I apply the collective term of zinc activated accelerators. The other stock is to contain rubber with or without sulphur, and a migratory zinc compound. These two stocks are mixed separately and calendered in the usual way without danger of mill or calender burning, and a ply of one stock is superimposed on a ply of the other stock. This plied sheet of rubber may then be rolled up and cured in a hot air oven.

As a specific example of the process, I give the following:

*Stock A.*

| | |
|---|---|
| Smoked sheet rubber | 96.5 |
| Sulphur | 2.5 |
| Dimethyl ammonium dimethyl dithio carbamate | 1 |

*Stock B.*

| | |
|---|---|
| Smoked sheet rubber | 95 |
| Zinc lactate | 5 |

A ply or sheet, for example 1/32″ thick, of stock B is run through the calender first and then on top of this ply a 1/32″ thick sheet of stock A is laid. This laminated sheet of rubber is then rolled up and heated for approximately 24 hours at 65° C. (150° F.). At the end of this time the sheet is fully cured.

I do not confine myself to this specific example, as any other migratory low temperature curing organic accelerator may be used, for example the carbon bisulphide product of piperidine, etc. Also any migratory zinc salt whether organic or inorganic, which is not a vulcanization accelerator, may be used. Examples of migratory zinc salts other than I give in the example, are zinc stearate, zinc ethyl mercaptide, zinc acetate, zinc butyrate, zinc dicyandiamide, zinc oleate, etc.

It is seen from the above description and specific example that the process occurs as follows:

Sulphur and dimethyl ammonium dimethyl dithio carbamate contained in stock A migrates into stock B and in the presence of the zinc salt causes the vulcanization of stock B. On the other hand, the zinc salt of stock B migrates into stock A, whereupon the sulphur and accelerator contained in stock A immediately causes vulcanization of stock A. The migratory zinc salt is not an accelerator in the process, but acts only to supply the zinc necessary to bring out the full effects of the accelerator employed.

Having thus described my invention, what I claim is:

1. The process of making an article of vulcanized rubber, which consists in producing two stocks, one containing rubber, sulphur and a migratory zinc-activated accelerator but no zinc activator, and the other rubber and a migratory zinc compound, juxtaposing said stocks, and subjecting the same to vulcanizing temperature.

2. The process of making an article of vulcanized rubber, which consists in producing two stocks, one containing rubber, sulphur, and a migratory accelerator but no zinc compound, and the other rubber and a migratory zinc compound, juxtaposing said stocks, and subjecting the same to vulcanizing temperature.

3. The process of making an article of vulcanized rubber, which consists in juxtaposing two rubber compounds, one containing a migratory zinc-activated ultra accelerator, but no zinc, and the other a zinc salt in migratory form, but no accelerator, and thereafter vulcanizing the article.

4. The process of producing a sheet of vulcanized rubber compound, which consists in providing a ply of rubber compound containing a migratory zinc-activated accelerator but no zinc, and a ply containing zinc in migratory form but no accelerator, juxtaposing said plies, and vulcanizing the same.

5. The process of producing a sheet of vulcanized rubber compound which consists in providing a ply of rubber compound containing a migratory zinc-activated accelerator but no zinc, and a ply containing a migratory zinc compound but no accelerator, juxtaposing said plies, rolling the laminated sheet upon itself, and vulcanizing the same.

In testimony whereof, I affix my signature.

HAROLD A. MORTON.